United States Patent
Sakai et al.

(10) Patent No.: US 6,410,608 B1
(45) Date of Patent: Jun. 25, 2002

(54) PROCESS FOR PRODUCING POLYURETHANE FOAM

(75) Inventors: Mitsuru Sakai; Atsushi Ishikawa; Masayoshi Morii, all of Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/744,917

(22) PCT Filed: Jul. 28, 1999

(86) PCT No.: PCT/JP99/04031

§ 371 (c)(1),
(2), (4) Date: Apr. 27, 2001

(87) PCT Pub. No.: WO00/06624

PCT Pub. Date: Feb. 10, 2000

(30) Foreign Application Priority Data

Jul. 31, 1998 (JP) ............................................. 10-217208

(51) Int. Cl.$^7$ .............................................. C08G 18/14
(52) U.S. Cl. ...................... 521/128; 521/118; 521/129; 521/164; 521/167; 521/170; 521/174
(58) Field of Search ................................ 521/128, 129, 521/118, 164, 167, 170, 174

(56) References Cited

U.S. PATENT DOCUMENTS 4,007,140 A * 2/1977 Ibbotson ..................... 521/129

| 4,421,869 A | 12/1983 | Arbir et al. |
| 4,714,719 A | 12/1987 | Yamasaki et al. |

FOREIGN PATENT DOCUMENTS

| JP | A62115015 | 5/1987 |
| JP | 62115015 A | 5/1987 |
| JP | A62115017 | 5/1987 |

* cited by examiner

Primary Examiner—John M. Cooney, Jr.
(74) Attorney, Agent, or Firm—Birch, Stewart, Kolasch & Birch, LLP

(57) ABSTRACT

A process for producing a polyurethane foam comprising reacting a polyol component with an isocyanate component in the presence of a catalyst comprising a compound represented by the formula (I):

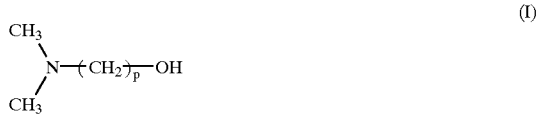

wherein p is an integer of 4 to 8, and a compound having a primary amino group and a tertiary amino group in its molecule, a blowing agent and a surfactant. The polyurethane foam obtained by the process of the present invention can be suitably used for heat insulating materials for construction materials, electric refrigerators, refrigerated warehouses, baths and the like, interior materials for automobiles, and the like.

4 Claims, 1 Drawing Sheet

PROCESS FOR PRODUCING POLYURETHANE FOAM

TECHNICAL FIELD

The present invention relates to a process for producing a polyurethane foam. More specifically, the present invention relates to a process for producing a polyurethane foam, which can be suitably used as heat insulating materials for construction materials, electric refrigerators, refrigerated warehouses, baths and the like, interior materials for automobiles, and the like.

BACKGROUND ART

A rigid polyurethane foam has been used as a heat insulating material for construction materials, electric refrigerators, refrigerated warehouses, baths, pipes, and the like since the rigid polyurethane foam is excellent in heat insulating property.

When a polyurethane foam is used, for instance, as a heat insulating material for a construction material for houses, buildings and the like, the polyurethane foam is produced by such a process comprising mixing components containing a polyol as a main component with components containing a polyisocyanate as a main component spraying the mixture to an objective site such as a wall surface or a ceiling under construction of houses, buildings and the like by a spraying machine to foam, and curing the foam.

As described above, when the polyurethane foam is allowed to foam and cured, distinctively strong odor due to the employed catalyst makes the working surroundings undesirable, and the unreacted catalyst remains in the polyurethane foam even after molding, so that there arise some problems such as odor and fogging. Recently, there has been proposed to use 6-dimethylamino-1-hexanol as a catalyst for producing a polyurethane which would little cause odor and fogging (Japanese Patent Laid-Open No. Sho 62-115017).

However, in the production of the polyurethane foam, when 6-dimethylamino-1-hexanol is used as a catalyst, it takes a long period of time for the production because of low reactivity at low temperatures between the polyol component and the isocyanate component which are used in the production of the polyurethane foam, nevertheless the problem regarding odor is solved. Particularly, when spraying is employed for foaming to cure, there arises a problem such as dripping, and there is a defect that its dimensional stability would be decreased at low temperatures because the heat generated during the production of a polyurethane foam is dissipated to the open air, so that the reaction is less likely to proceed, thereby lowering compression strength.

An object of the present invention is to provide a process capable of rapidly producing a polyurethane foam being excellent in dimensional stability even under the surroundings of low temperatures, with little generation of odor due to a catalyst.

DISCLOSURE OF INVENTION

According to the present invention, there is provided a process for producing a polyurethane foam comprising reacting a polyol component with an isocyanate component in the presence of a catalyst comprising a compound represented by the formula (I):

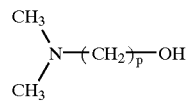

(I)

wherein p is an integer of 4 to 8, and a compound having a primary amino group and a tertiary amino group in its molecule, a blowing agent and a surfactant.

BEST MODE FOR CARRYING OUT THE INVENTION

Figure 1:
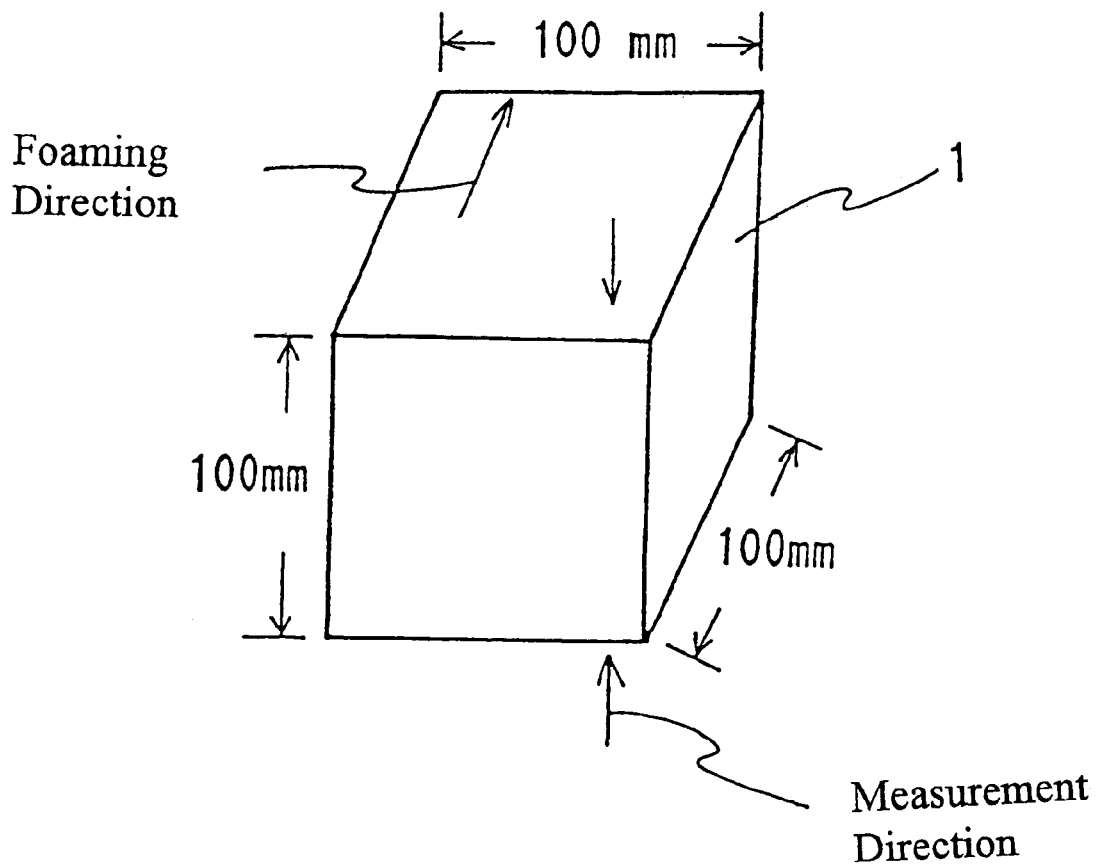
FIG. 1 is a schematic explanatory view of a test piece of a polyurethane foam used when determining dimensional stability at low temperatures.

One of the features of the present invention resides in the use of a catalyst comprising a compound represented by the formula (I):

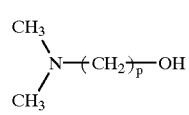

(I)

wherein p is an integer of 4 to 8, and a compound having a primary amino group and a tertiary amino group in its molecule.

When the above catalyst is used, odor due to the catalyst is little generated during the production of a polyurethane foam. Moreover, there is exhibited an excellent effect such that a polyurethane foam being excellent in dimensional stability can be rapidly produced even under the surroundings of low temperatures as in winter season and the like. The reasons for exhibiting the excellent effect described above are presumably based on the facts that the compound represented by the formula (I) suppresses the odor of the compound having a primary amino group and a tertiary amino group in its molecule when the compound represented by the formula (I) is used together with the compound having a primary amino group and a tertiary amino group in its molecule, and that the reactivity at low temperatures is improved by the synergistic effects of their combined use, so that the molecular weight of a polyurethane foam increases. As a result, dimensional stability at low temperatures is improved.

As described above, since the above-mentioned catalyst is used in the present invention, these excellent effects are exhibited. Therefore, a rigid polyurethane foam can be produced by directly spraying to an objective site such as a wall surface or a ceiling under construction of houses, buildings and the like by means of a spraying machine to foam, and curing the foam even under surroundings of low temperatures, and the rigid polyurethane foam can be suitably used as a heat insulating material for construction materials and the like. Moreover, since the formed polyurethane foam generates little odor due to the catalyst, there can be obtained a semi-rigid polyurethane foam which can be suitably used, for instance, for interior materials for automobiles such as headrests, and the like.

As preferred examples of the compound represented by the formula (I), there can be cited 6-dimethylamino-1-hexanol, 4-dimethylamino-1-butanol and 8-dimethylamino-1-octanol. Among them, 6-dimethylamino-1-hexanol is especially preferable.

As representative examples of the compound having a primary amino group and a tertiary amino group in its molecule, there can be cited a compound represented by the formula (II):

$$R^1R^2N\text{-}(CH_2)_m\text{-}A\text{-}(CH_2)_n\text{-}NH_2 \quad (II)$$

wherein each of $R^1$ and $R^2$ is independently an alkyl group having 1 to 4 carbon atoms, or may be bonded to each other to form a 3- to 6-membered nitrogen-containing heterocyclic group; and when A is oxygen atom, each of m and n is independently an integer of 2 to 6, or when A is a single bond, each of m and n is a positive integer satisfying m+n=2 to 8.

As concrete examples of the compound having a primary amino group and a tertiary amino group in its molecule represented by the formula (II), there can be cited dialkylaminoalkylamines such as 3-dimethylaminopropylamine, 3-diethylaminopropylamine, 3-dipropylaminopropylamine, 4-dimethylaminobutylamine, 6-dimethylaminohexylamine, 3-(dimethylaminoethoxy)propylamine, 2-dibutylaminoethylamine and 8-dimethylaminooctylamine; heterocyclic aminoalkylamines such as 2-(-1-aziridinyl)ethylamine, 3-(1-pyrrolidinyl)-1-propylamine, N-(2-aminoethyl)piperazine, N-methyl-N'-(2-aminoethyl)piperazine, 1,4-bis(2-aniinoethyl)piperazine, N-(3-aminopropyl)piperazine, N-methyl-N'-(3-aminopropyl)piperazine, 1,4-bis(3-aminopropyl)piperazine, 2-(1-morpholino)ethylamine and 3-(1-morpholino)propylamine; and the like. These can be used alone or in admixture of not less than two kinds. Among them, at least one compound selected from 3-dimethylaminopropylamine, 4-dimethylaminobutylamine, 6-dimethylaminohexylamine and 3-(dimethylaminoethoxy)propylamine, especially 3-dimethylaminopropylamine can be suitably used, from the viewpoint that little odor is generated when those compounds are used together with the compound represented by the formula (I).

It is desired that the compound represented by the formula (I)/the compound having a primary amino group and a tertiary amino group in its molecule [weight ratio] is not less than 10/90, preferably not less than 20/80, from the viewpoint of odor, and that the weight ratio is not more than 90/10, preferably not more than 80/20, from the viewpoint of reactivity.

In addition, it is desired that the total amount of the compound represented by the formula (I) and the compound having a primary amino group and a tertiary amino group in its molecule is not less than 0.5 parts by weight, preferably not less than 1 part by weight, based on 100 parts by weight of the polyol component, from the viewpoints of increasing reactivity between the polyol component and the isocyanate component, and improving dimensional stability at low temperatures, and that the total amount is not more than 10 parts by weight, preferably not more than 8 parts by weight, based on 100 parts by weight of the polyol component, from the viewpoint of maintaining the strength of the polyurethane foam.

Other catalysts can be employed within a range which would not hinder the object of the present invention. When the other catalyst is used, the internal temperature of a polyurethane foam attains to 100 to 130° C. or so during the production of the polyurethane foam. Therefore, it is preferable that the other urethane promoting catalyst has a boiling point of not less than 130° C., from the viewpoints of suppressing its evaporation or volatilization. The other urethane promoting catalyst includes, for instance, tertiary amines and their derivatives such as 1,4-diazabicyclo[2.2.2]octane, 2-methyl-1,4-diazabicyclo[2.2.2]octane, N-ethylmorpholine, N-(dimethylaminoethyl)morpholine, N,N,N',N'-tetramethylpropylenediamine, N,N,N',N'-tetramethylhexamethylenediamine, N,N',N'-trimethylaminoethylpiperazine, N,N-dimethylcyclolhexylamine, N,N-dimethylbenzylamine, N,N,N',N'',N''-pentamethyldiethylenetriamine, bis(2-dimethylaminoethyl) ether, 1,8-diazabicyclo[5.4.0]undecene-7, N,N',N''-tris(3-dimethylaminopropyl)hexahydro-s-triazine, N,N-dimethylethanolamine, N,N-dimethylaminoethoxyethanol and N,N-dimethylaminoethoxyethoxyethanol; salts of these with an acid such as a carboxylic acid and carbonic acid; organo-metal compounds represented by organotin compounds; and the like. In addition, for the purpose of imparting fire-retardant property to a polyurethane foam, the catalyst can be used together with an isocyanurate promoting catalyst represented by potassium salts such as potassium acetate and potassium octylate. Each of the amounts of the other urethane promoting catalyst and the isocyanurate promoting catalyst is not limited to specified ones, and can be usually properly adjusted within the range which would not hinder the object of the present invention.

The polyol component is not limited to specified ones, as long as the polyol component has been conventionally used in the production of a polyurethane foam.

As representative examples of the polyol component, there can be cited polyols having 2 to 8 functional groups of and hydroxyl values of 250 to 700; and the like.

As concrete examples of the polyol component, there can be cited a polyester-polyol obtained by reacting a dibasic acid such as adipic acid, succinic acid, phthalic acid or fumaric acid, with a polyhydric alcohol such as ethylene glycol, diethylene glycol, 1,4-butanediol, glycerol, trimethylolpropane or propylene glycol; dihydric alcohols such as ethylene glycol, diethylene glycol, propylene glycol, dipropylene glycol, neopentyl glycol and 1,4-butanediol; trihydric or higher polyhydric alcohols such as glycerol, diglycerol, pentaerythritol, trimethylolpropane, sorbitol and sucrose; polyether-polyols obtained by adding an alkylene oxide such as ethylene oxide or propylene oxide to a polyamine such as ethylenediamine, tolylenediamine, 1,3-propanediamine or isophoronediamine; and the like. These polyols can be used alone or in admixture of not more than two kinds.

As the isocyanate component, there can be cited, for instance, aromatic polyisocyanates such as 2,4-tolylene diisocyanate, 2,6-tolylene diisocyanate, 4,4'-diphenylmethane diisocyanate, 2,2'-diphenylmethane diisocyanate, 2,4'-diphenylmethane diisocyanate, polymethylenepolyphenylene polyisocyanate, xylylene diisocyanate and naphthylene diisocyanate; aliphatic polyisocyanates such as hexamethylene diisocyanate and lysine diisocyanate; alicyclic polyisocyanates such as hydrogenated diphenylmethane diisocyanate, hydrogenated tolylene diisocyanate and isophorone diisocyanate; modified compounds of the above-mentioned polyisocyanates containing at least one bond of urethane bond, carbodiimide bond, uretoimine bond, allophanate bond, urea bond, biuret bond, isocyanurate bond, and the like. These can be used alone or in admixture of not less than two kinds.

It is preferable that the proportion of the polyol component to the isocyanate component is adjusted so that the isocyanate index usually becomes 95 to 300.

As the blowing agent, there can be cited, for instance, water; low-boiling point hydrocarbons such as isopentane, normal pentane and cyclopentane; gases such as nitrogen gas, air and carbon dioxide; HCFC-141b, HFC-134a, HFC-245fa, HFC-245ca, HFC-236ea, HFE-347, and the like. These can be used alone or in admixture of not more than two kinds.

The amount of the blowing agent used cannot be absolutely determined, because the amount differs depending upon its kinds and the density of a desired polyurethane foam. Therefore, it is desired that the amount is properly adjusted depending upon the kinds of these blowing agents and the like.

The surfactant can be any of those conventionally used ones in the production of the polyurethane foam. As representative examples of the surfactant, there can be cited silicone surfactants such as dimethylpolysiloxane and polyoxyalkylene-modified dimethylpolysiloxane; anionic surfactants such as salts of fatty acids, salts of sulfuric acid esters, salts of phosphoric acid esters and sulfonates; and the like.

The amount of the surfactant used cannot be absolutely determined, because the amount differs depending upon its kinds and the density of a desired polyurethane foam. Therefore, it is desired that the amount is properly adjusted depending upon the kinds of these surfactants and the like.

Moreover, in the present invention, there can be employed optional components other than those mentioned above, for instance, other auxiliaries such as flame retardants and fillers within a range which would not hinder the object of the present invention.

The polyurethane foam can be molded, for instance, by mixing a polyol mixture obtained by mixing a polyol component, a blowing agent, a catalyst, a surfactant and other auxiliaries, with an isocyanate component in a molding machine with stirring; injecting the mixture into a mold; and allowing the mixture to foam. More specifically, for example, the polyurethane foam can be produced by heating the above-mentioned polyol mixture to about 40° C. using a tank or the like, and allowing the polyol mixture to react with the isocyanate component using a foaming machine such as an automatically mixing and injecting foaming machine or an automatically blending and injecting foaming machine.

As explained above, since the present invention uses a catalyst having a specified composition in the production, there can be rapidly produced a polyurethane foam being excellent in dimensional stability at low temperatures, even under the surroundings of low temperatures as in winter season.

Accordingly, the process of the present invention can be suitably employed when a heat insulating material comprising the polyurethane foam is directly formed as a heat insulating material for a wall surface and a ceiling for houses and buildings under construction.

In addition, since the produced polyurethane foam generates little odor due to the catalyst, an obtained semi-rigid polyurethane foam can be suitably used, for instance, for cushioning materials for headrests and the like.

Examples 1 to 8 and Comparative Examples 1 to 7

One-hundred parts by weight of a polyol component [45% by weight of propylene oxide/ethylene oxide adduct of sucrose (hydroxyl value: 360, manufactured by Sumitomo Bayer Urethane Co., LTD. under the trade name of Polyol 0475); 45% by weight of propylene oxide/ethylene oxide adduct of tolylenediamine (hydroxyl value: 450, manufactured by Asahi Glass Company Ltd. under the trade name of Excenol 455AR); and 10% by weight of propylene oxide/ ethylene oxide adduct of glycerol (hydroxyl value: 280, manufactured by MITSUI CHEMICALS, INC. under the trade name of Polyol MN-700)], 1.5 parts by weight of a surfactant [manufactured by Nippon Unicar Company Limited under the trade name of L-5340: silicone-based surfactant], 0.5 parts by weight of water and 27.5 parts by weight of HCFC-141b as blowing agents, and a catalyst having a composition shown in Table 1 were mixed in a mixer, to give a mixture (polyol mixture).

Next, the resulting polyol mixture and an isocyanate component [manufactured by Sumitomo-Bayer Urethane K.K. under the trade name of Sumidule 44V20] were mixed at 5° C. by a Labomixer with stirring, so that the isocyanate index attained to 105. Two-hundred and fifty grams of the resulting mixture was injected into a mold [internal dimensions: 150×150×300 (height) mm], and a free foam of a rigid polyurethane foam was molded.

The reactivity during the preparation of the rigid polyurethane foam, and the core density and the dimensional stability (low-temperature shrinkage ratio) at low temperatures of the resulting rigid polyurethane foam were evaluated on the bases of the following methods. The results are shown in Table 1.

A. Reactivity

Forty grams of the mixture of the polyol mixture and the isocyanate component, obtained in each of Examples and Comparative Examples was poured into a 300 ml-polyethylene cup, and the time period for reaching cream time (hereinafter referred to as CT) and the time period for reaching the gel time (hereinafter referred to as GT) were determined.

B. Dimensional Stability at Low Temperatures

The free foam of the obtained rigid polyurethane foam was allowed to stand for one day, and thereafter a test piece having a size of 100×100×100 mm was cut out from its core portion.

Next, this test piece was placed in a thermostatic chamber of −5° C., and allowed to stand for 24 hours. Thereafter, as shown in FIG. 1, the dimensional stability in a direction perpendicular to the foaming direction of a test piece 1 was calculated by the equation:

[Dimensional Stability (%)]

=[Dimension after allowing to stand—Dimension before allowing to stand]

÷[Dimension before allowing to stand]×100

C. Core Density

The weight of the test piece obtained when evaluating the above-mentioned "B. Dimensional Stability at Low Temperatures" was determined, and the core density was calculated by the following equation:

[Core density] =[Weight of test piece] [Volume of test piece]

D. Odor of Catalyst

A 140 ml-glass bottle with a lid was charged with 2 g of a catalyst used in each of Examples and Comparative Examples, which was accurately weighed, and the lid was placed on the bottle. The lidded bottle was allowed to stand in a thermostatic chamber at 25° C. for 20 hours. Thereafter, odor was determined with an odor sensor [manufactured by New Cosmos Electric Co., Ltd., XP-329].

It is indicated in Table 1 that the smaller the numerical value is, the lower the odor is.

TABLE 1

| | Composition of Catalyst (Parts by Weight) | | Reactivity (sec) | | Core Density (kg/m³) | Dimensional Stability (%) | Odor |
|---|---|---|---|---|---|---|---|
| | | | CT | GT | | | |
| Ex. No. | | | | | | | |
| 1 | 6-Dimethylamino-1-Hexanol (1.0) | 3-Dimethylaminopropylamine (3.0) | 13 | 47 | 31.0 | −2.3 | 720 |
| 2 | 6-Dimethylamino-1-Hexanol (2.0) | 3-Dimethyiaminopropylamine (2.0) | 15 | 48 | 30.8 | −3.1 | 250 |
| 3 | 6-Dimethylamino-1-Hexanol (3.0) | 3-Dimethylaminopropylamine (1.0) | 17 | 50 | 30.8 | −3.5 | 150 |
| 4 | 6-Dimethylamino-1-Hexanol (2.0) | 4-Dimethylaminobutylamine (2.0) | 15 | 48 | 31.3 | −2.5 | 330 |
| 5 | 6-Dimethylamino-1-Hexanol (2.0) | 6-Dimethyiaminohexylamine (2.0) | 16 | 49 | 31.2 | −2.7 | 290 |
| 6 | 6-Dimethylamino-1-Hexanol (2.0) | 3-(Dimethylaminoethoxy)-propylamine (2.0) | 16 | 49 | 30.6 | −3.9 | 280 |
| 7 | 4-Dimethylamino-1-Butanol (2.0) | 3-Dimethylaminopropylamine (2.0) | 14 | 48 | 30.7 | −3.0 | 740 |
| 8 | 8-Dimethylamino-1-Octanol (2.0) | 3-Dimethylaminopropylamine (2.0) | 16 | 50 | 31.2 | −2.6 | 180 |
| Comp. Ex. No. | | | | | | | |
| 1 | 6-Dimethylamino-1-Hexanol (4.0) | — | 19 | 53 | 31.2 | −7.6 | 90 |
| 2 | — | 3-Dimethylaminopropylamine (4.0) | 12 | 45 | 30.7 | −2.1 | 2000< |
| 3 | — | 4-Dimethylaminobutylamine (4.0) | 12 | 46 | 30.6 | −3.0 | 2000< |
| 4 | — | 6-Dimethylaminohexylamine (4.0) | 13 | 47 | 30.3 | −2.8 | 2000< |
| 5 | — | 3-(Dimethylaminoethoxy)-propylamine (4.0) | 13 | 47 | 30.1 | −3.1 | 2000< |
| 6 | 4-Dimethylamino-1-Butanol (2.0) | — | 18 | 51 | 30.9 | −8.2 | 250 |
| 7 | 8-Dimethylamino-1-Octanol (2.0) | — | 21 | 57 | 31.4 | −8.1 | 80 |

It can be seen from the results shown in Table 1 that according to Examples 1 to 8, the reactivity during the production of a polyurethane foam is excellent because CT and GT are short nevertheless molding was carried out at low temperatures, that the dimensional stability at low temperatures is excellent because the change in dimensions is small, and that there can be obtained polyurethane foams with little generating odor due to a catalyst.

INDUSTRIAL APPLICABILITY

According to the process of the present invention, there can be rapidly produced a polyurethane foam being excellent in dimensional stability even under the surroundings of low temperatures, with little generating odor due to a catalyst during the production of the polyurethane foam. The produced polyurethane foam can be suitably used for heat insulating materials for construction materials, electric refrigerators, refrigerated warehouses, baths and the like, interior materials for automobiles, and the like.

What is claimed is:

1. A process for producing a polyurethane foam comprising reacting a polyol component with an isocyanate component in the presence of a catalyst comprising a compound represented by the formula (I):

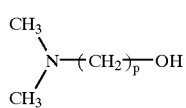

(I)

wherein p is an integer of 4 to 8, and a compound having a primary amino group and a tertiary amino group in its molecule represented by the formula (II):

wherein each of $R^1$ and $R^2$ is independently an alkyl group having 1 to 4 carbon atoms, or may be bonded to each other to form a 3- to 6-membered nitrogen-containing heterocyclic group; and when A is oxygen atom, each of m and n is independently an integer of 2 to 6, or when A is a single bond, each of m and n is a positive integer satisfying m+n=2 to 8, a blowing agent and a surfactant.

2. The process according to claim 1, wherein the compound having a primary amino group and a tertiary amino group in its molecule is at least one compound selected from the group consisting of 3-dimethylaminopropylamine, 4-dimethylaminobutylamine, 6-dimethylaminohexylamine and 3-(dimethylaminoethoxy)propylamine.

3. The process according to claim 1, wherein the compound represented by the formula (I) / the compound having a primary amino group and a tertiary amino group in its molecule are present in a weight ratio of 10/90 to 90/10.

4. The process according to claim 1, wherein the compound represented by the formula (I) is 6-dimethylamino-1-hexanol.

* * * * *